Dec. 29, 1931.  G. A. CHADBOURNE  1,839,141
SWEEP HAY RAKE
Filed Feb. 28, 1931  3 Sheets-Sheet 3
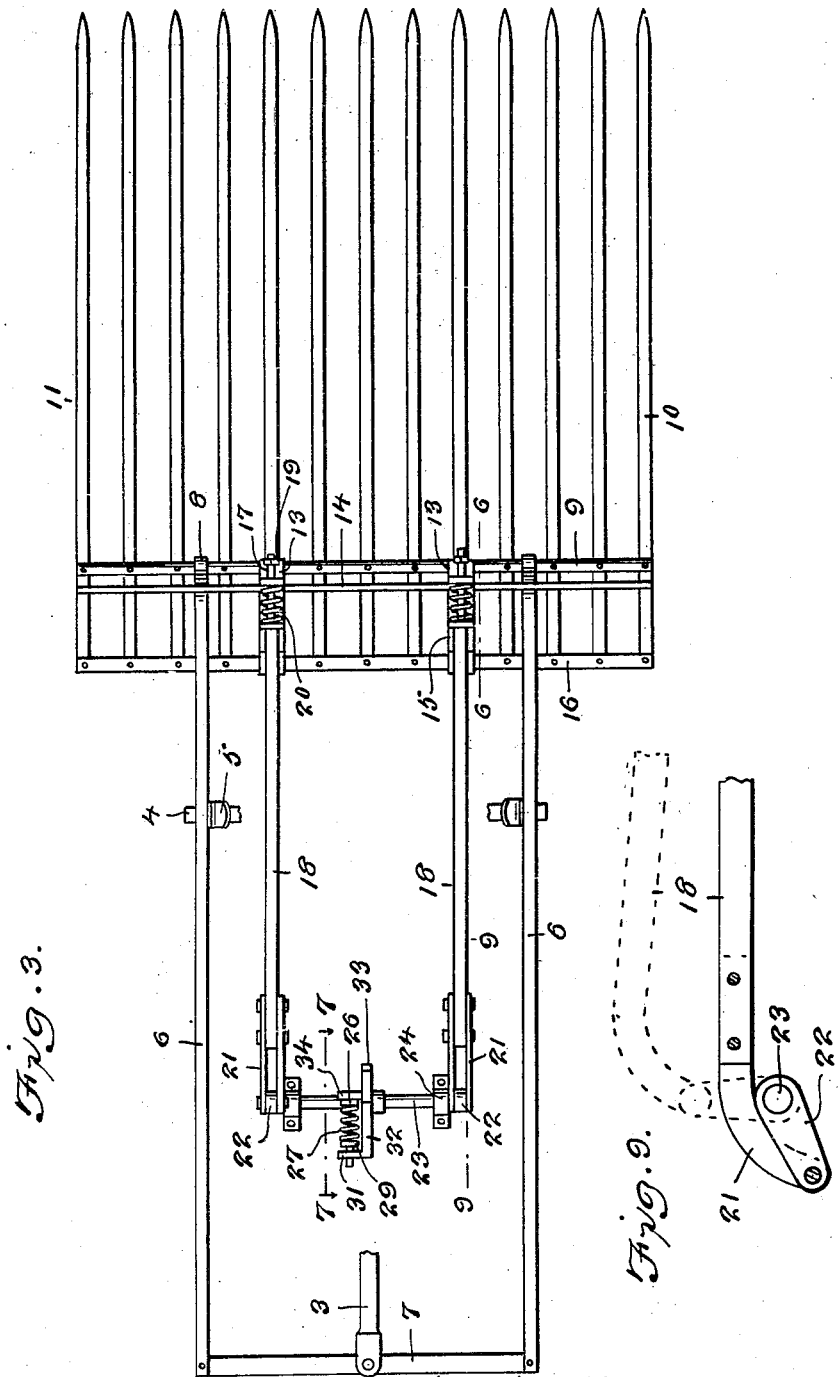

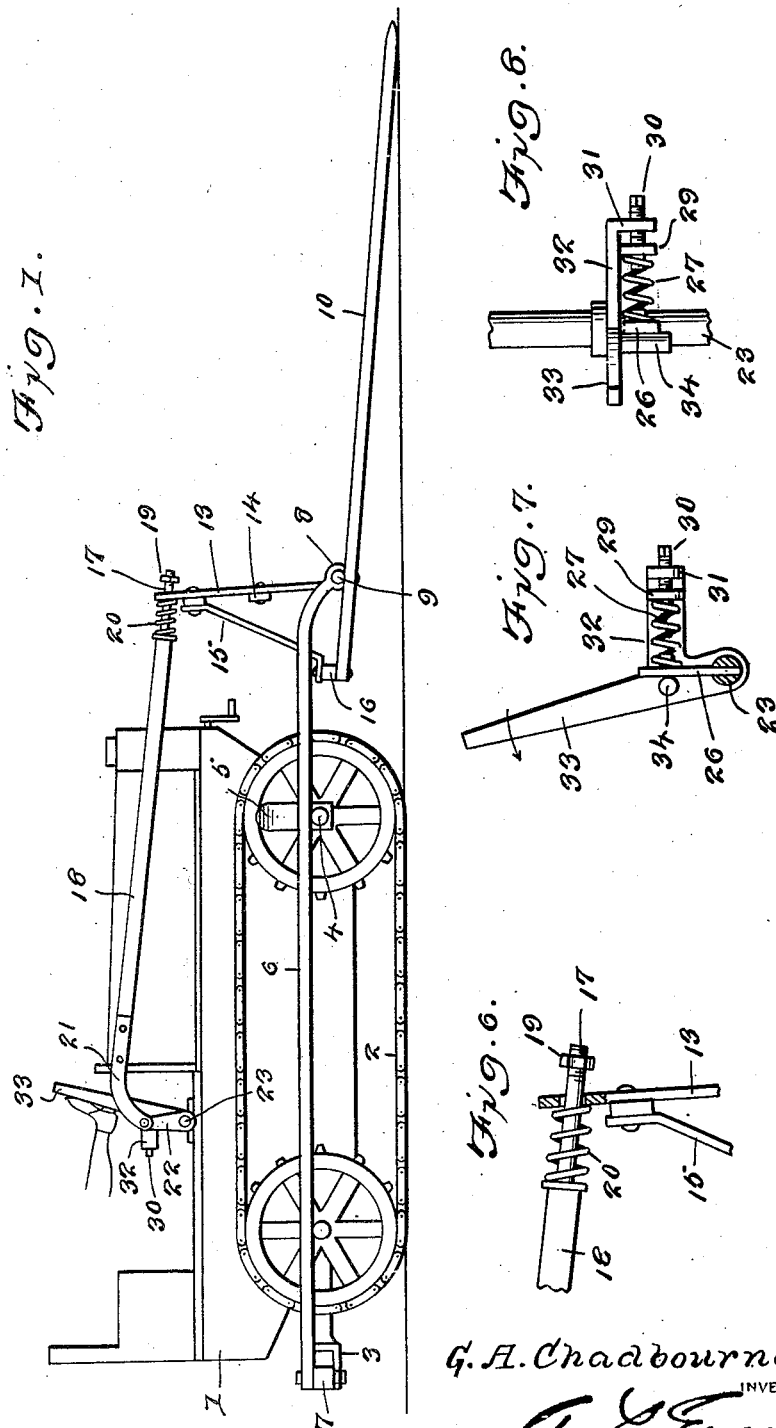

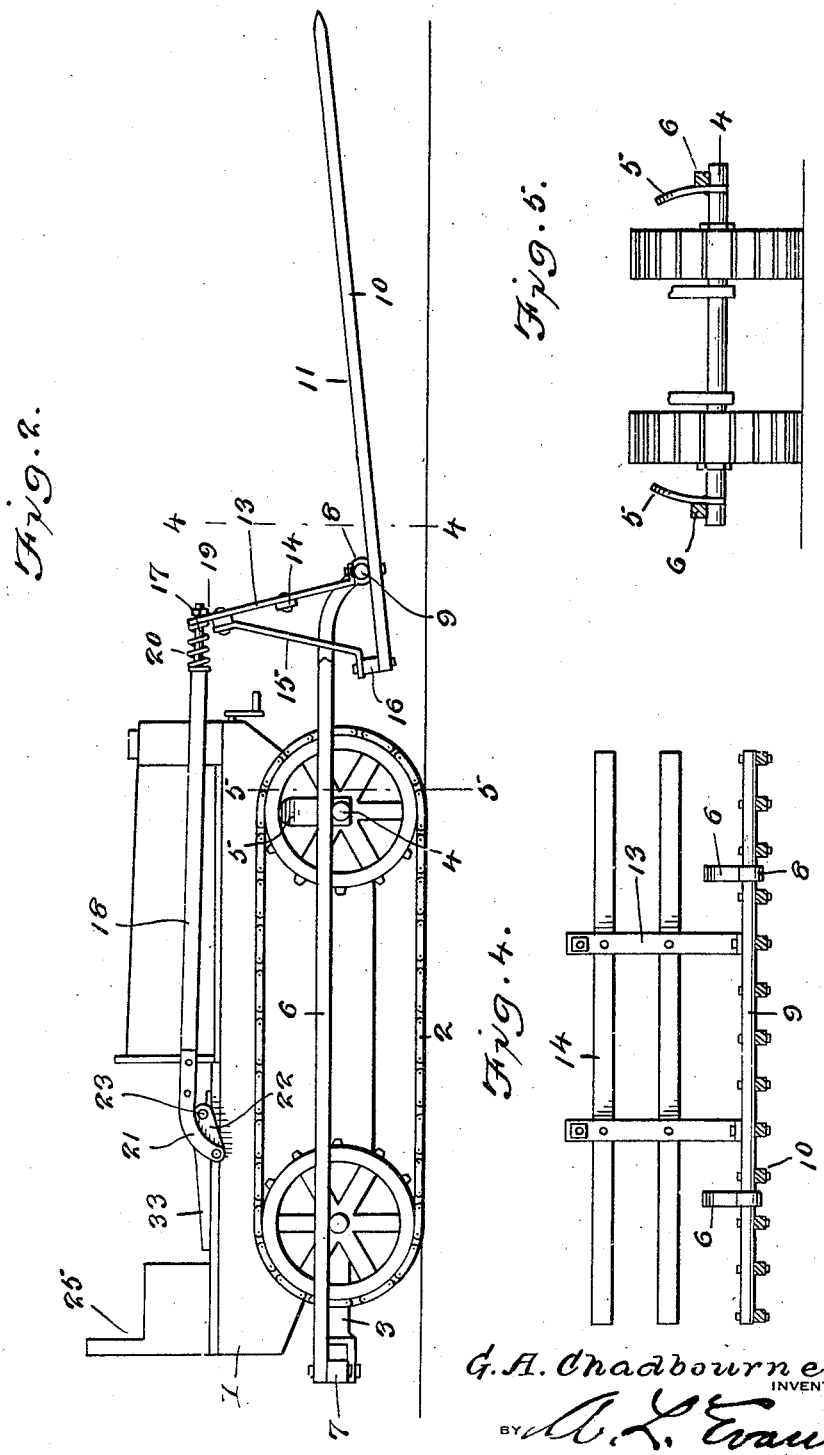

Patented Dec. 29, 1931

1,839,141

UNITED STATES PATENT OFFICE

GLENN A. CHADBOURNE, OF CHADBOURN, MONTANA

SWEEP HAY RAKE

Application filed February 28, 1931. Serial No. 519,223.

My present invention has reference to a sweep rake and among my objects is the provision of a hay rake of this character which is supported on the frame of a tractor in a manner whereby the same may be readily attached or removed as desired, one wherein the rake is cushioned to amply withstand any shocks to which the same may be subjected and which will automatically move out of contact with an obstruction and wherein the rake may be lowered to determined degrees and likewise elevated by the throw of a pedal that is within easy reach of the operator of the tractor.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of my improved sweep rake in applied position.

Figure 2 is a similar view showing the rake elevated.

Figure 3 is a top plan view, the tractor being removed.

Figure 4 is a sectional view approximately on the line 4—4 of Figure 2.

Figure 5 is a sectional view approximately on the line 5—5 of Figure 2.

Figure 6 is a detail sectional view approximately on the line 6—6 of Figure 3.

Figure 7 is a sectional view approximately on the line 7—7 of Figure 3.

Figure 8 is a plan view of the parts of the improvement disclosed by Figure 7.

Figure 9 is a sectional view approximately on the line 9—9 of Figure 3.

In the drawings the numeral 1 designates a conventional form of tractor. The front and rear wheels of the tractor are in the nature of sprocket wheels and have trained therearound the endless chains 2 that provide the propelling means for the tractor. The tractor, at the rear thereof, is provided with the usual clevis to which implements to be drawn by the tractor are hitched. The clevis is indicated by the numeral 3.

The axle 4 for the front wheels of the tractor is projected a suitable distance beyond said wheels and has fixedly secured thereon inwardly arched upwardly extending plates 5, and these plates are contacted by the side members 6 of the frame of the improvement that are attached to the tractor, the said side members resting on the projecting ends of the axle 4.

The frame is substantially U-shaped in plan, that is, the same includes the side members 6 and a rear connecting member 7 which member 7 is secured to the jaw or clevis 3. The side members project a suitable distance beyond the front of the tractor and are arched downwardly, the said arched portions terminating in eyes 8 that afford bearings for the cross sectional rounded portion of the rod or bar 9 that is secured to the teeth 10 of the sweep rake 11.

Secured to the bar 9 is a pair of spaced upstanding plates 13, respectively. The plates have secured by rivets or the like to the rear face thereof a pair of transverse bars 14 which provide the open back for the rake 11, and the bars 14 have secured thereto downwardly extending angle brace members 15 which have their lower ends rigidly secured to the rear transverse bar or plate 16 for the teeth of the sweep rake 11.

The bars or plates 13 have freely passed through openings in their upper portions the reduced and threaded ends 17 of rods 18. The parts 17 of the members 18 are in the nature of rods and have screwed thereon nuts 19, while arranged around the rods and exerting a tension between shoulders provided by the members 18 and the inner faces of the plates 19 there are coiled springs 20. The springs are in the nature of buffer members and afford a yieldable connection between the members 18 and the sweep rake, permitting the sweep rake to yield upwardly should the teeth contact with an obstruction.

The members 18 are in the nature of arms and are arranged along the opposite sides of the hood for the motor of the tractor 1 and the said arms, have secured to their sides, at their ends, plates 21, which are arched downwardly or in the direction of the platform of the tractor. Between each pair of arched plates 21 there is pivoted a link 22, and the links are keyed or otherwise fixedly secured to a shaft 23. The transversely arranged shaft 23 is journaled in bearings 24 supported in the floor of the tractor forward of the driver's seat 25. The shaft 23, at the center thereof, has fixed thereto a normally upstanding key or finger 26 whose outer face is provided with a lug that affords a rest for one of the end convolutions of a coil expansion spring 27, the second end of the spring engaging with the lug on a plate or block 29. The outer face of the block 29 preferably has a swivel engagement with a bolt 30 and this bolt is screwed through an opening in the angle end 31 of an arm 32 that is fixed on or integrally formed with the operating lever 33. The lever 33 has a pin or lug 34 to contact with the finger 26, the lever being freely journaled on the shaft 23 and held by suitable means from longitudinal movement thereon.

The spring 27 is of a greater strength than that of the springs 20 so that the same, in connection, with the said springs 20, will cause the lever 33 to swing toward the floor of the tractor and as a result a longitudinal movement in a rearward direction is imparted to the arms 18 whose headed ends (nuts 19) contacting with the plates 21 will cause the rake to be swung upwardly, as disclosed by Figure 2 of the drawings. When the rake is to be swung downwardly the lever is raised and is held by the foot of the operator of the tractor, as disclosed by Figure 1 of the drawings. The pressure of the teeth of the rake toward or against the ground is regulated by the pressure of the operator's foot on the lever or pedal 23.

The arched spring plates 5 serve to hold the side members of the frame in proper position on the ends of the axle 4, permit of a vertical yielding of the frame and hold the frame from contact with the front or guide wheels of the tractor so that the rake will be properly guided ahead of the tractor when the tractor rounds curves and travels over irregular paths.

It is believed the foregoing description will fully and clearly set forth the improvement and the advantages thereof to those skilled in the art to which the invention relates so that further detailed description will not be required.

Having described the invention, I claim:

1. A sweep hay rake for tractors including a frame which has its rear portion centrally fixed to the tractor, its side members resting on the axle of the steering wheels of the tractor and a rake to which the front end of the frame is pivotally connected, upstanding elements on the rake at the rear thereof, spring tensioned arms received through said elements, a shaft journaled transversely on the tractor forward of the driver's seat, links fixed to the shaft and pivotally connected to the inner ends of the arms and to which the ends of the arms are fixed, a pedal lever journaled on the shaft, a lug on the lever, a finger fixed on the shaft and spring means carried by the lever for normally holding the finger in contact with the lug.

2. A sweep rake for tractors in which the axle for the front wheels of the tractor is extended, and vertically disposed inwardly curved spring plates on said projections, a frame having its rear portion centrally connected to the rear of the tractor, its sides resting on the axle extensions and in contact with the arched spring plates and said sides having their outer ends rounded downwardly, a sweep rake to which the ends of the frame members are pivoted, upstanding plates on the rear of the rake, brace means for the plates, transverse bars connecting the plates and brace means, arms having reduced ends which are threaded and which are passed through the plates and which arms are engaged by nuts, springs on the arms in contact with the plates, said arms being positioned on the opposite sides of the hood of the tractor and having their inner ends rounded downwardly, links pivotally secured to said ends, a transversely arranged shaft journaled on the tractor forward of the driver's seat to which the links are fixed, a pedal lever journaled on the shaft, having an extension whose end is offset, and likewise having a lug opposite the offset end of the extension, a finger fixed on the shaft, a spring contacting with the finger, an adjustable element on the offset end of the extension contacting with the spring and said spring designed to force the finger into engagement with the lug, for the purpose set forth.

In testimony whereof I affix my signature.

GLENN A. CHADBOURNE.